(12) United States Patent  
Wo et al.

(10) Patent No.: US 8,831,384 B2
(45) Date of Patent: Sep. 9, 2014

(54) SERVICE INFORMATION PLATFORM WITH IMAGE SEARCHING FUNCTION

(75) Inventors: Hai-Tao Wo, Shanghai (CN); Pei-Hsun Tsai, New Taipei (TW); Hiroshi Kamiyama, New Taipei (TW)

(73) Assignee: Richplay Information Co., Ltd, New Taipei (TW)

( * ) Notice: Subject to any disclaimer, the term of this patent is extended or adjusted under 35 U.S.C. 154(b) by 37 days.

(21) Appl. No.: 13/612,387

(22) Filed: Sep. 12, 2012

(65) Prior Publication Data

US 2013/0287320 A1    Oct. 31, 2013

(30) Foreign Application Priority Data

Apr. 27, 2012   (TW) .............................. 101207889 U

(51) Int. Cl.
  *G06K 9/54*  (2006.01)
  *G06K 9/60*  (2006.01)
(52) U.S. Cl.
  USPC ........................................................ 382/305
(58) Field of Classification Search
  USPC .................. 382/100, 181, 305, 313
  See application file for complete search history.

(56) References Cited

U.S. PATENT DOCUMENTS

| 2011/0145093 | A1* | 6/2011 | Paradise et al. ............. 705/26.41 |
| 2012/0127276 | A1* | 5/2012 | Tsai et al. ........................ 348/47 |
| 2012/0229657 | A1* | 9/2012 | Calman et al. ............. 348/207.1 |
| 2013/0033522 | A1* | 2/2013 | Calman et al. ................ 345/633 |

* cited by examiner

*Primary Examiner* — Phuoc Tran
(74) *Attorney, Agent, or Firm* — Muncy, Geissler, Olds & Lowe, P.C.

(57) ABSTRACT

The present invention provides a service information platform with searching function, which comprises at least a photographic device, at least a user terminal, and a server device. The photographic device takes a picture of an object or a product label of the object and produces an image file. The user terminal connects to the server device and transmits the image file to the server device. After the server device receives the image file, a processor is used for producing an analysis result, which is used for searching at least a piece of service information related to the image file from the Internet or the classified service information database in the server device. Then the service information is returned back to the user terminal. Thereby, the user can acquire the service information from the Internet or the service information uploaded to the classified service information database by information suppliers.

10 Claims, 4 Drawing Sheets

SERVICE INFORMATION PLATFORM WITH IMAGE SEARCHING FUNCTION

FIELD OF THE INVENTION

The present invention relates generally to a platform with searching function, and particularly to a service information platform with image searching function, in which an image file produced by a photographic device is transmitted to a server device, and the service information is searched from the Internet or the classified service information databases disposed in the server device according to the analysis result of the image file.

BACKGROUND OF THE INVENTION

With progresses in technologies, mobile devices having network and multimedia functions are introduced daily. In addition, carriers usually provide promotional networking rates for mobile devices. Thereby, mobile network is becoming popular. The mobile network services derived from mobile devices are also developing prosperously. The consumer group acquiring network information using mobile devices is growing rapidly, and hence becoming the marketing target of various industries.

Besides, most modern mobile devices have camera functions and the image identification technology in search engines is mature gradually. Customer can acquire the required information conveniently and rapidly by using the image file taken real-timely as the search parameter and using mobile networking.

Accordingly, the present invention provides a platform with image searching function, which comprises a server device capable of connecting to user terminal held by a consumer. When the consumer wishes to inquire the related information of an object, he only needs to take a picture of the object or a product label using a photographic device. A produced image file is transmitted to the server device via the user terminal. The server device can use a processor to analyze the image file and produce an analysis result. Then the analysis result is searched from the Internet or the classified service information databases disposed in the server device and returning at least a piece of service information related to the image file back to the user terminal.

Moreover, from the viewpoint of an information supplier, the classified service information databases in the server device are a platform for publishing service information. Various information suppliers can connect to the server device via a supply terminal and upload at least a piece of service information related to the information suppliers to the server device. The uploaded pieces of service information are stored in the plurality of classified service information databases according to their classifications. Alternatively, the storage devices of the information suppliers storing the pieces of service information are allowed to connect to the server device, so that the customer can access the storage devices via the server device. Hence, a platform gathering information of various information suppliers and enabling them to classify and publish service information freely is established. From the platform, consumers can search and acquire the service information related to the image file. In addition to commercial firms, an individual can also be an information supplier for providing service information such as news events or comments on products.

SUMMARY

An objective of the present invention is to provide a service information platform with image searching function for simplifying the method by which a user searches service information. A user can use a user terminal to transmit an image file taken by a photographic device to a server device. Then the user can receive at least a piece of service information returned by the server device after the server device searches using an analysis result, which is produced by a processor's analysis of the image file.

Another objective of the present invention is to provide a service information platform with image searching function, which gathers the service information from various information suppliers and facilitates a user to search the service information provided. The information suppliers can upload at least a piece of service information to a server device via at least an information supplier terminal. The service information is stored in at least a classified service information database according to its classification. Thereby, the server device can search at least a piece of service information related to an image file, geographical information, and input information uploaded by a user terminal.

For achieving the objectives described above, the present invention provides a service information platform with image searching function, which comprises at least a photographic device, at least a user terminal, and a server device. The photographic device takes a picture of an object or a product label, such as a text trademark, a graphic trademark, a graphic and text trademark, a three-dimensional trademark, a barcode, or a two-dimensional code, of the object and produces an image file, which is then uploaded to the server device via a user terminal such as a handheld mobile terminal, a tablet computer, a notebook computer, or a desktop computer. After the server device receives the image file, a processor is used for producing an analysis result. The server device searches according to the analysis result for acquiring and returning at least a piece of service information related to the image file back to the user terminal. The analysis result can be a feature identification code. In addition to the image file produced by the photographic device, the user terminal can also transmit geographical information or input information to the server device for searching at least a piece of service information related to the geographical information or the input information.

In addition, the server device can be connected with at least a supplier terminal, which can build at least a classified service information database in the server device. The server device can store at least a piece of service information uploaded and classified according to the classified service information database, or connect at least a storage device storing the service information to the server device via the supplier terminal. Thereby, the server device can gather various pieces of service information. At least a piece of service information related to the image file uploaded by the user terminal, the geographical information, or the input information can thus be searched.

DETAILED DESCRIPTION

In order to make the structure and characteristics as well as the effectiveness of the present invention to be further understood and recognized, the detailed description of the present invention is provided as follows along with embodiments and accompanying figures.

The service information platform with image searching function according to the present invention comprises a server device. A least a user terminal receives an image file taken by at least a photographic device. A processor analyzes the image file and produces an analysis result. The server device can search using the analysis result and acquire at least a piece of service information related to the image file. Then the service information is transmitted back to the user terminal and thus simplifying the method by which a user searches service information. The server device can store at least a piece of service information uploaded by at least a supplier terminal to at least a classified service information database according to classification, and gather service information of various information suppliers for users. Thereby, information suppliers can use the service information platform according to the present invention to classify and publish their service information at will for achieving the effects of serving users and advertisement. On the other hand, users can use the image searching function provided by the present invention to inquire and acquire the service information of the information supplier related to an object by simply taking a picture of the object.

Figure 1:
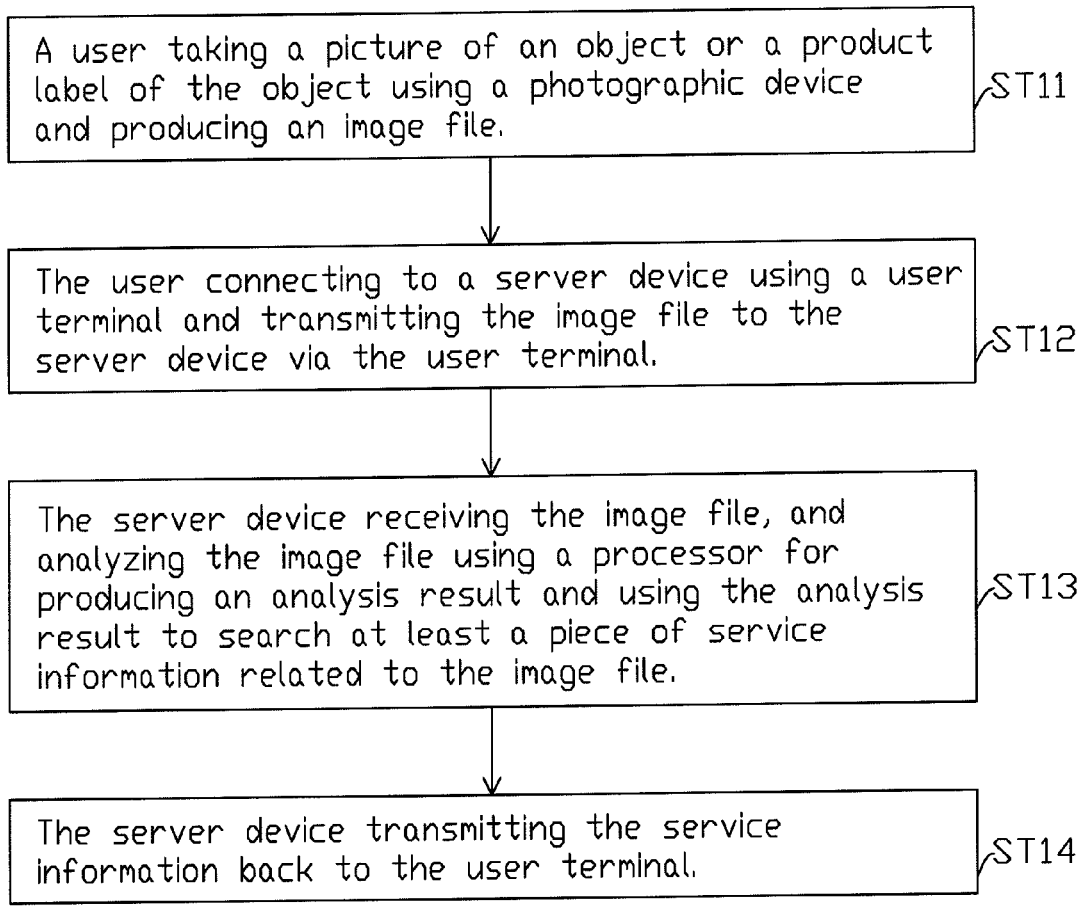
FIG. 1 shows a user's steps according to the first embodiment of the present invention.
Figure 2:
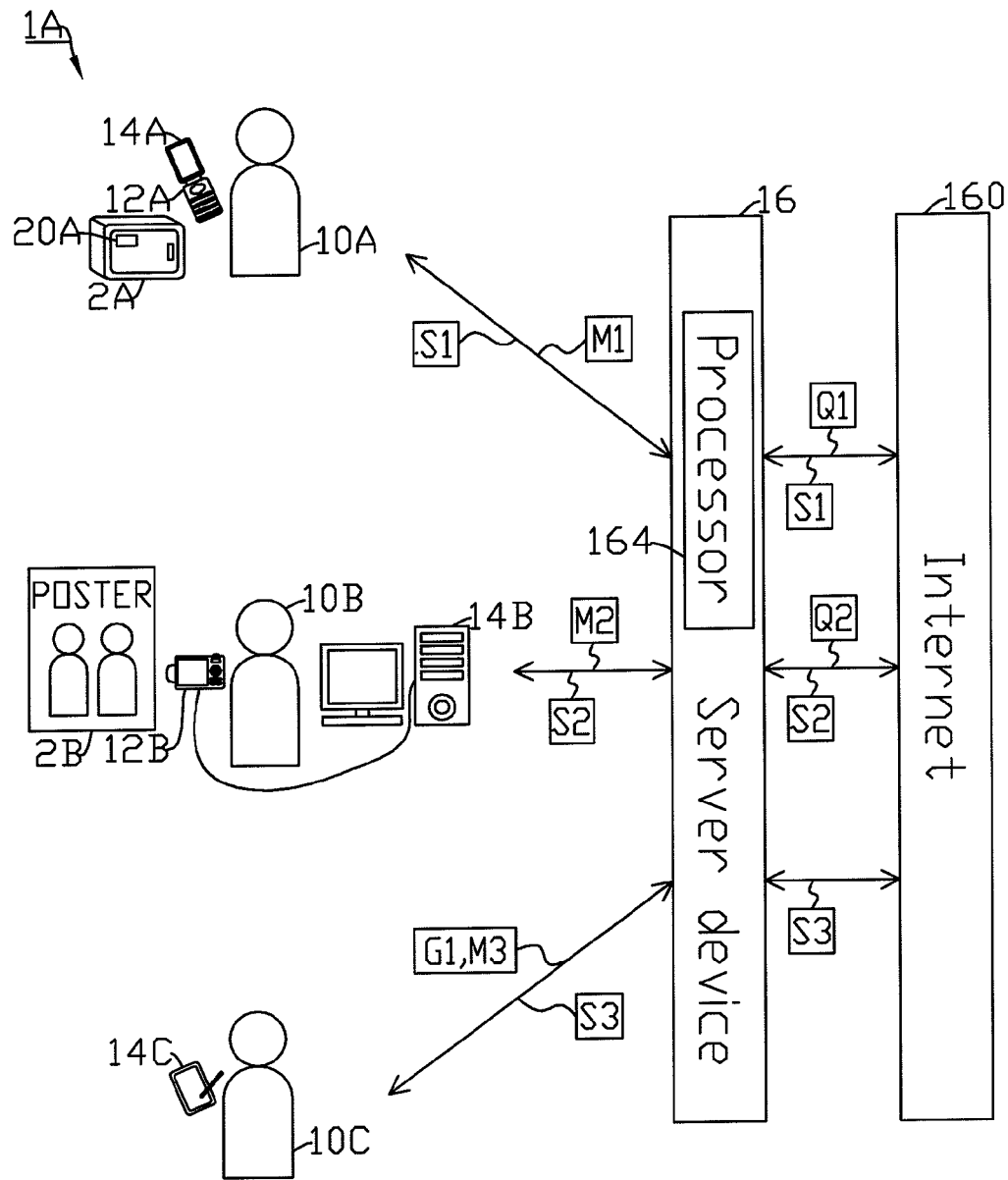
FIG. 2 shows a schematic diagram of device connections according to the first embodiment of the present invention.

FIG. 1 and FIG. 2 show a user's steps and a schematic diagram of device connections according to the first embodiment of the present invention. As shown in FIG. 1, the steps by which a user takes a picture and searches service information using the service information platform with image searching function according to the present invention comprise:

ST11: A user taking a picture of an object or a product label of the object using a photographic device and producing an image file;

ST12: The user connecting to a server device using a user terminal and transmitting the image file to the server device via the user terminal;

ST13: The server device receiving the image file, and analyzing the image file using a processor for producing an analysis result and using the analysis result to search at least a piece of service information related to the image file; and ST14: The server device transmitting the service information back to the user terminal.

As shown in FIG. 2, the service information platform with image searching function 1A according to the present invention allows a plurality of users, including a first, a second, and a third users 10A, 10B, 10C to connect to a server device 16, which includes a processor 164, using a plurality of user terminals. The user terminals include a first, a second, and a third user terminal 14A, 14B, 14C. The server device 16 is connected to the Internet 160; the user terminals 14A, 14B can be connected with photographic devices 12A, 12B, respectively.

According to the present embodiment, the first user terminal 14A is a mobile phone 14A. The first photographic device 12A is a built-in camera 12A of the mobile phone disposed in the mobile phone 14A. The built-in camera 12A of the mobile phone takes a picture of a first object 2A, which is a product 2A with a product label 20A. The second photographic device 12B is a camera 12B. The second user terminal 14B is a desktop computer 14B. The camera 12B can be connected with the desktop computer 14B. The second object 2B shot by the camera 12B is a poster 2B. Besides, the third user terminal 14C is a handheld computer. In addition to the mobile phone, desktop computer, and handheld computer described in the present embodiment, the user terminal according to the present invention can also be other types of devices such as handheld mobile terminals, tablet computers, or notebook computers.

The devices shown in FIG. 2 will be used to accompany the description of the steps in FIG. 1. A first user 10A uses a built-in camera 12A of mobile phone to take a picture of a product label 20A of a product 2A and produce a first image file M1. The mobile phone 14A is connected to a server device 16 and transmits the first image file M1 to the server device 16. The server device 16 uses a processor 164 to analyze the first image file M1 and produce a first analysis result Q1. The first analysis result Q1 is used to search the Internet 160 and gives auction information S1 related to the product 2A. The auction information S1 is transmitted back to the mobile phone 14A. Thereby, the first user 10A can get the auction information S1. The analysis result Q1 can be a feature identification code. The product label 20A can be a text trademark, a graphic trademark, a graphic and text trademark, a three-dimensional trademark, a barcode, or a two-dimensional code. Compared to the product 2A, taking pictures of the product label 20A can attain better analysis performance, which is beneficial for searching and acquiring the required information.

A second user 10B uses a camera 12B to shoot a poster 2B and produce a second image file M2. The camera 12 is connected to a desktop computer 14B, which is connected with the server device 16. The second image file M2 is transmitted to the server device 16. The server device 16 uses the processor 164 to analyze the second image file M2 and produce a second analysis result Q2. The second analysis result Q2 is used to search the Internet 160 and gives screenplay information S2 related to the poster 2B. The screenplay information S2 is transmitted back to the desktop computer 14B. Thereby, the second user 10B can get the screenplay information S2.

A third user 10C does not have a photographic device. He uses a handheld computer 14C to connect to the server device 16. The geographical information G1 of the place he locates and input information M3 are transmitted to the server device 16. The server device 16 searches the Internet 160 according to the geographical information G1 and the input information and gives recommended shop information S3.

Accordingly, at least a user terminal 14A~14C receives the image files M1, M2, the geographical information G1, or the input information M3. The processor 164 analyzes the image files M1, M2 and produces the analysis results Q1, Q2. The analysis results Q1, Q2, the geographical information G1, or the input information M3 are used to search the Internet 160 for at least a piece of service information S1~S3 related to the image files M1, M2, the geographical information, or the input information M3. The service information S1~S3 is then transmitted back to the terminals 14A~14C. Thereby, users can uses the image searching function according to the present invention to inquire information simply by taking pictures and acquire the service information of information suppliers related to the objects.

Figure 3:
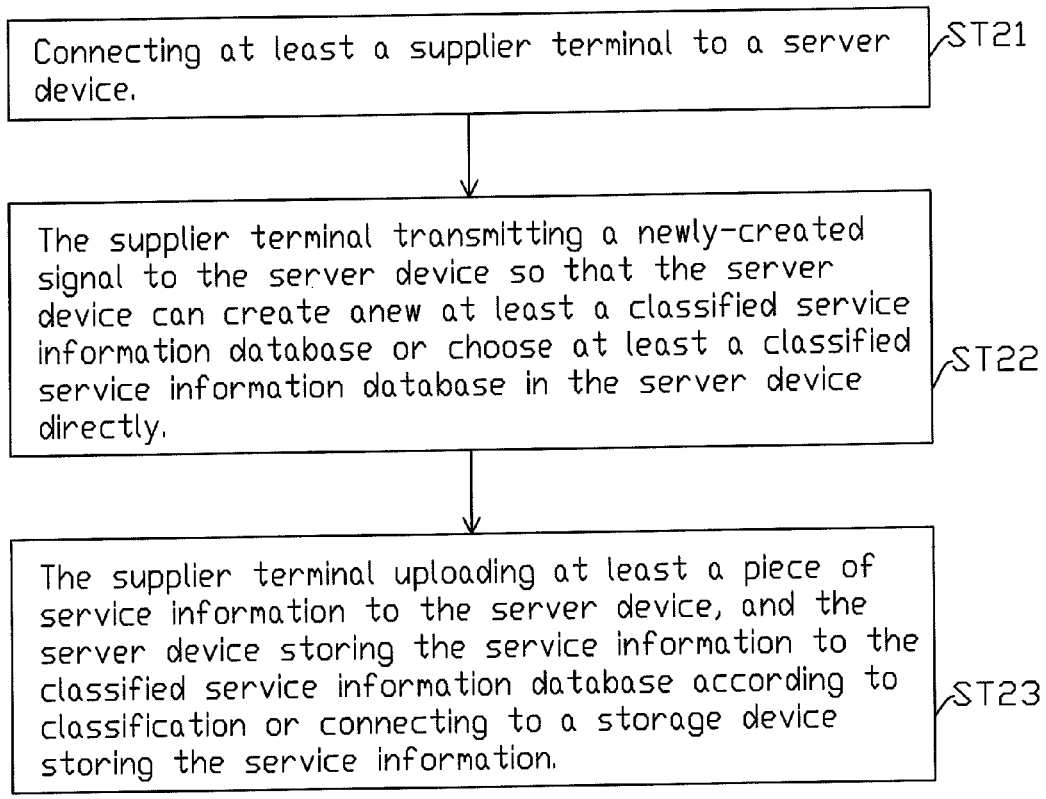
FIG. 3 shows an information supplier's steps according to the second embodiment of the present invention.
Figure 4:
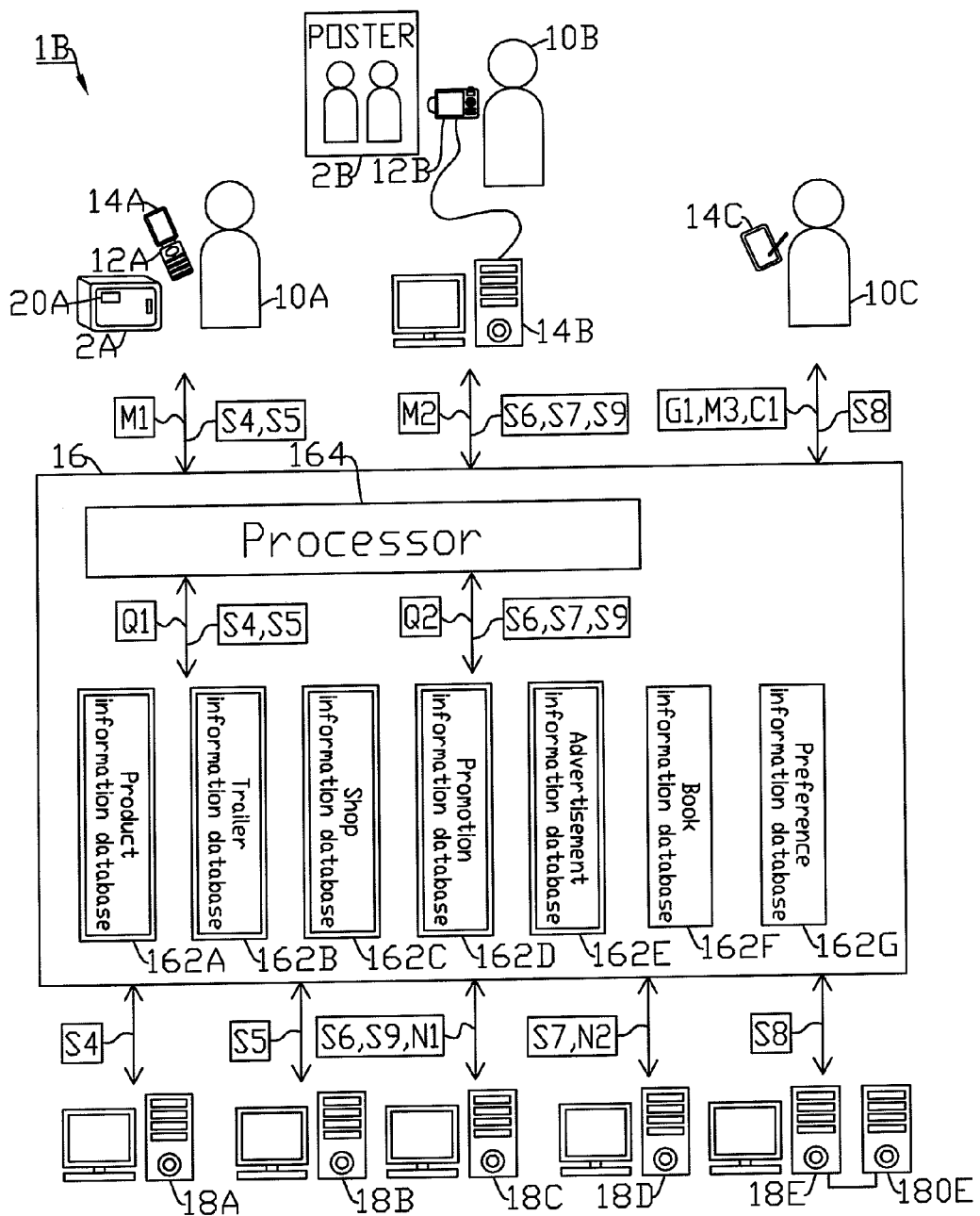
FIG. 4 shows a schematic diagram of device connections according to the second embodiment of the present invention.

FIG. 3 and FIG. 4 show an information supplier's steps and a schematic diagram of device connections according to the second embodiment of the present invention. As shown in FIG. 3, according to the service information platform with image function according to the present invention, the steps by which an information supplier builds a classified service information database comprise:

ST21: Connecting at least a supplier terminal to a server device;

ST22: The supplier terminal transmitting a newly-created signal to the server device so that the server device can create anew at least a classified service information database or choose at least a classified service information database in the server device directly; and ST23: The supplier terminal uploading at least a piece of service information to the server device, and the server device storing the service information to the classified service information database according to classification or connecting to a storage device storing the service information.

As shown in FIG. 4, the service information platform with image searching function 1B according to the present invention provides a server device 16 as the first embodiment does. A plurality of users 10A~10C connect to the server device 16 having the processor 164 via a plurality of user terminals 14A~14C. Besides, the plurality of user terminals 14A, 14B can be connected with a plurality of photographic devices 12A, 12B. The difference between the present embodiment and the first one is that the server device 16 according to the present embodiment stores a plurality of classified service information databases 162A~162G and a plurality of pieces of service information S4~S9.

The first user terminal 14A is a mobile phone 14A; the second user terminal 14B is a desktop computer 14B; the third user terminal 14C is a handheld computer 14C. The first photographic device 12A is a build-in camera 12A of mobile phone 14A; the second photographic device 12B is a camera. The plurality of classified service information databases 162A~162E are stored in the server device 16 in advance and are a product information database 162A, a trailer information database 162B, a shop information database 162C, a promotion information database 162D, and an advertisement information database 162E, respectively. The classified service information databases 162F, 162G are created anew according to a first newly-created signal N1 and a second newly-created signal N2, and are a book information database 162F and a preference information database 162G. The plurality of supplier terminals 18A~18E are a manufacturer's terminal 18A, a dealer's terminal 18B, a film producer's terminal 18C, a credit-card issuer's terminal 18D, and a restaurant's terminal 18E, respectively. The first object 2A is a product 2A; the second object 2B is a poster 2B; the service information S4~S9 includes product information S4, promotion information S5, a movie trailer S6, preference information of credit card S7, shop information S8, and original-work information S9.

The devices shown in FIG. 4 will be used to accompany the description of the steps in FIG. 3. Take a third supplier terminal 18C as an example. The third supplier terminal 18C is a film producer's terminal 18C, which is connected to the server device 16 and transmits a newly-created signal N1 to the server device 16 for establishing a book information database 162F in the server device 16. A trailer information database 162B is selected. The film producer's terminal 18C uploads the stores a movie trailer S6 to the trailer information database 162B and original-work information S9 to the book information database 162F.

Similar to the film producer's terminal 18C, the manufacture's terminal 18A uploads product information S4 to the product information database 162A; the dealer's terminal 18B uploads promotion information S5 to the promotion information database 162D; the credit card issuer's terminal 18D transmits a second newly-created signal N2 for establishing a preference information database 162G and uploads preference information S7 to the preference information database 162G; the restaurant's terminal 18E is connected to a storage device 180E storing shop information S8. The shop information database 162C can access the storage device 180E. Thereby, for the information suppliers uploading or connecting to the server device 16 using the plurality of supplier terminals 18A~18E, the server device 16 provides a platform that publishes and classifies the service information S4~S9.

According to the present embodiment, the first user 10A uses the built-in camera 12A of a mobile phone to shoot a product label 20A of a product 2A and produce a first image file M1, which is then uploaded to the server device 16 via connection of the mobile phone 14A to the server device 16. The server device 16 uses a processor 164 to analyze the first image M1 and produce a first analysis result Q1, which is used to search in the plurality of classified service information databases 162A~162G. In other words, the product information S4 related to the first image file M1 is given from a product information database 162A and the promotion information S5 related to the first image file M1 is given from a promotion information database 162D. The product information S4 and the promotion information S5 are transmitted back to the mobile phone 14A from the server device 16. Thereby, the first user 10A can get the product information S4 as well as the promotion information S5. Similar to the previous description, the analysis result Q1 can be a feature identification code. The product label 20A can be a text trademark, a graphic trademark, a graphic and text trademark, a three-dimensional trademark, a barcode, or a two-dimensional code. Compared to the product 2A, taking pictures of the product label 20A can attain better analysis performance, which is beneficial for searching and acquiring the required information.

The second user 10B uses a camera 12B to shoot a poster 2B and produce a second image file M2. The camera 12B is connected with a desktop computer 14B, which is connected to the server device 16 for transmitting the second image file M2 to the server device 16. The server device 16 uses a processor 164 to analyze the second image M2 and produce a second analysis result Q2, which is used to search in the plurality of classified service information databases 162A~162G. In other words, the movie trailer information S6 related to the second image file M2 is given from a trailer information database 162B; the credit-card preference information S7 related to the second image file M2 is given from a preference information database 162G; and the original-work information S9 related to the second image file M2 is given from a book information database 162F. The movie trailer information S6, the credit-card preference information S7, and the original-work information S9 are transmitted back to the mobile phone 14B from the server device 16. Thereby, the second user 10B can get the movie trailer information S6, the credit-card preference information S7, and the original-work information S9.

The third user 10C uses a handheld computer 14C to connect to the server device 16 and transmits the geographical information G1 of the handheld computer 14C, input information M3, and a classification message C1 to the server device 16. The server device 16 selects the shop information database 162C according to the classification message C1. Then the server device 16 searches the shop information database 162C and a storage device 180E of the shop information database 162 by connecting through the restaurant's terminal 18E using the geographical and input information G1, M3 and gives the shop information S8 related to the geographical information G1 and the input information M3. The server device 16 transmits the shop information S8 back to the handheld computer 14C. Thereby, the third user 10C can get the shop information S8.

Accordingly, the supplier terminal 18A~18E can create or select at least a classified service information database 162A~162G in the server device 16 according to the information supplier steps ST21~ST23 and upload at least a piece of service information S4~S9 to the server device 16. Besides, the service information S4~S9 is stored in the plurality of classified service information database 162A~162G according to the classification. Thereby, the users 10A~10C can search and acquire the service information S4~S9 uploaded or provided for access by the plurality of supplier terminals 18A~18E by uploading the first image file M1, the second image file M2, the geographical information G1, or the input information M3. Hence, the information suppliers can use the service information platform according to the present invention to classify freely and publish their service information for users, and thus achieving the purposes of serving users and advertise the information suppliers.

To sum up, the present invention provides a service information platform with image searching function. An information supplier can upload service information to the classified service information database in a server device according to classification via a supplier terminal. The server device can collect the service information from various information suppliers. Hence, the information suppliers can advertise or provide service to users. The users can connect to the server device using user terminals. By uploading image files, geographical information, or input information, searches can be performed in the Internet or one to multiple classified service information databases disposed in the server device for returning the service information related to the image files, the geographical information, or the input information. A user can also acquire an information supplier's identity for uploading a plurality of pieces of service information news events or comments on products.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A service information platform with image searching function, comprising:
    at least a photographic device, shooting an object and producing an image file related to said object;
    at least a user terminal, connected with said photographic device; and
    a server device, connected with said user terminal, receiving said image file, using a processor to analyze said image file and produce an analysis result, said server device including a plurality of classified service information databases established by a plurality of supplier terminals connected with said server device, said server device using said analysis result to search at least a piece of service information related to said image file from at least one classified service information database in said server device, and transmitting said service information back to said user terminal;
    wherein said server device creates an anew classified service information database according to at least one supplier terminal, and said server device receives and stores said service information from said supplier terminal to said classified service information database according to classifications of said classified service information databases, and said service information related to said object is provided by the classified service information database, said classified service information database is established by said supplier terminal connected with said server device.

2. The service information platform with image searching function of claim 1, wherein said photographic device is disposed on said user terminal.

3. The service information platform with image searching function of claim 1, wherein said photographic device shoots the product label of said object.

4. The service information platform with image searching function of claim 3, wherein said product label is a text trademark, a graphic trademark, a graphic and text trademark, a three-dimensional trademark, a barcode, or a two-dimensional code.

5. The service information platform with image searching function of claim 1, wherein said user terminal is a handheld mobile terminal, a tablet computer, a notebook computer, or a desktop computer.

6. The service information platform with image searching function of claim 1, wherein said analysis result is a feature identification code.

7. The service information platform with image searching function of claim 1, wherein said supplier terminal can be connected with a storage device for enabling said server device to access said storage device.

8. The service information platform with image searching function of claim 1, wherein said classified service information database can be a product information database, a trailer information database, a shop information database, a promotion information database, an advertisement information database, a book information database, or a preference information database.

9. The service information platform with image searching function of claim 1, wherein said server device receives an analysis result produced by an image file, geographical information, or input information from said user terminal for searching said classified service information database.

10. The service information platform with image searching function of claim 1, wherein said server device receives an analysis result produced by an image file, geographical information, or input information from said user terminal for searching the classified service information database assigned by a classification message.

* * * * *